March 5, 1968 A. E. SKRZEC 3,371,999
PURIFICATION OF BY-PRODUCT SULFUR FORMED
FROM CHLORINATION PROCESSES
Filed May 25, 1965 2 Sheets-Sheet 2

A-A

INVENTOR.
ADAM E. SKRZEC
BY
AGENT

United States Patent Office 3,371,999
Patented Mar. 5, 1968

3,371,999
PURIFICATION OF BY-PRODUCT SUL-
FUR FORMED FROM CHLORINATION
PROCESSES
Adam E. Skrzec, West Nyack, N.Y., assignor to Stauffer
Chemical Company, New York, N.Y., a corporation of
Delaware
Filed May 25, 1965, Ser. No. 458,701
7 Claims. (Cl. 23—224)

This invention relates to the purification of sulfur. In particular, it pertains to the removal of halides from sulfur formed as a by-product from halogenation processes. Still more particularly, the invention contemplates a method of purifying sulfur by freeing it from chlorides of sulfur and iron.

Sulfur chlorides are used extensively in chemical processes as a means of introducing chlorine into numerous types of chemical substrates. In such reactions, elemental sulfur is often formed as a by-product, particularly where the sulfur chloride is sulfur monochloride, $S_2Cl_2$. Because it is contaminated with sulfur chlorides used in the chlorination reactions, by-product sulfur is of little value and is scarcely worth recovering. In fact, its disposal often presents a not inconsiderable cost factor.

An area of chemical industry where by-product sulfur has been a chronic problem is in carbon tetrachloride production. This important solvent is manufactured commercially by the chlorination of carbon disulfide in accordance with the following chemical equations:

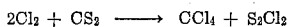

$$2Cl_2 + CS_2 \longrightarrow CCl_4 + S_2Cl_2$$

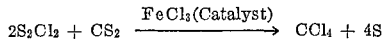

$$2S_2Cl_2 + CS_2 \xrightarrow{FeCl_3\text{(Catalyst)}} CCl_4 + 4S$$

As can be seen from the equations, sulfur monochloride is formed as one of the products of the direct chlorination of carbon disulfide. The sulfur monochloride then itself functions as a chlorinating agent by reacting further with additional carbon disulfide in the presence of an iron halide catalyst such as ferric chloride, thereby forming more carbon tetrachloride plus elemental sulfur as a by-product. Since carbon tetrachloride produced from the chlorination of carbon disulfide amounts to millions of pounds annually, it is evident that sizeable quantities of by-product sulfur are produced. Because of the entrained sulfur chlorides plus traces of the iron halide catalyst, the recovered sulfur is unsatisfactory for many of the purposes for which pure sulfur is adapted and as previously pointed out, its disposal constitutes an operational expense.

There have been numerous proposals directed at finding uses and applications for by-product sulfur collected from carbon tetrachloride production. For instance, where the carbon tetrachloride plant makes its own carbon disulfide by reacting sulfur vapor with methane, the sulfur by-product has been recycled back to the carbon disulfide generator for conversion into carbon disulfide and thence transformed into more carbon tetrachloride. However, the sulfur and iron chloride impurities in the sulfur by-product resulted in excessive corrosion of metal parts as well as contaminating the resultant carbon tetrachloride which was thereby rendered unsuitable for many purposes calling for a pure material. There have been attempts to purify by-product sulfur by removing the objectionable sulfur chlorides. Perhaps the procedure most commonly practiced consists of blowing steam through the molten sulfur by-product in order to hydrolyze the sulfur chlorides. Although this expels some of the volatile chloride contaminants, the sulfur is still unsuitable for many purposes. It is not sufficiently free of chlorides whereby it can be used in carbon tetrachloride manufacture; nor has the iron been removed. Moreover, the hydrolysis of sulfur chlorides results in the evolution of hydrogen chloride and sulfur dioxide which because of their highly corrosive and poisonous properties are exceedingly damaging to man and materials.

In accordance with the present invention, it has been discovered that halide impurities as exemplified by sulfur and iron chlorides can be effectively removed from sulfur by passing molten droplets of the sulfur counter-currently through an aqueous medium whereby the halide impurities are dissolved out by the aqueous medium as the sulfur droplets travel therethrough. By aqueous medium is meant water or a dilute aqueous solution of a base such as the hydroxides of the alkali metals, i.e., sodium hydroxide, potassium hydroxide, etc., an alkaline with hydroxide, i.e., calcium hydroxide, etc., ammonium hydroxide and the like. After the sulfur droplets traverse the aqueous medium, they are allowed to coalesce and the resulting chloride and iron free sulfur collected and is then suitable for any purpose or application calling for a pure sulfur. In practicing the invention, I have achieved excellent results by forming a dispersion of the halide contaminated sulfur in the upper end of a vertical cylindrical tank filled with a dilute solution of caustic soda, the temperature of which is above the melting point of sulfur, and allowing the sulfur droplets to fall through the solution whereby the halide impurities are removed or extracted out. The sulfur droplets coalesce at the bottom of the tank forming a layer of liquid sulfur which is drawn off and collected or recycled directly to the carbon disulfide generating unit of a carbon tetrachloride plant.

Reference is now made to the accompanying diagrammatic drawings in which.

Figure 1:
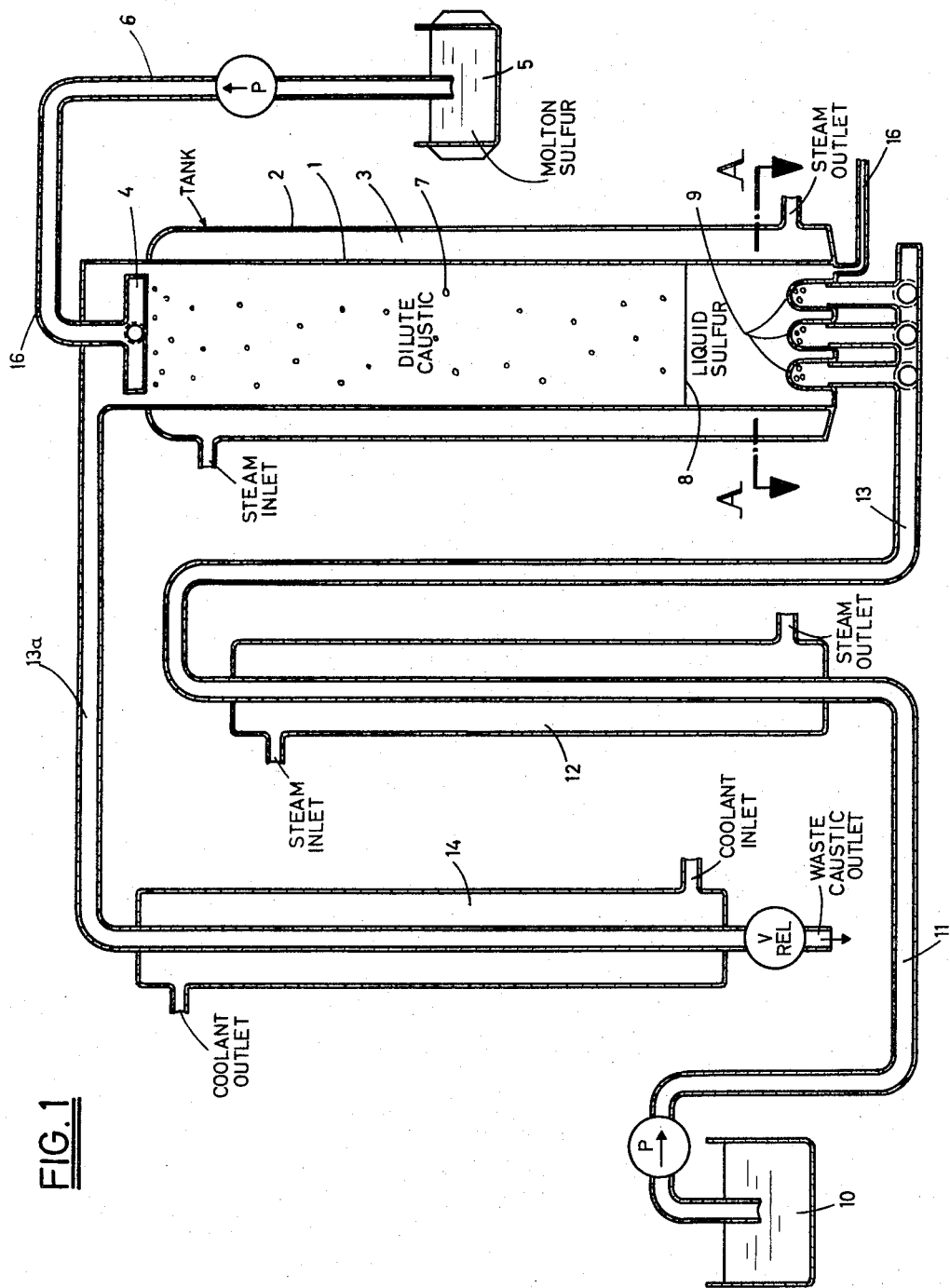
FIG. 1 is a section view of a vertical extraction tank for dispersing molten sulfur through dilute caustic solution.

Referring to the drawings in detail, FIG. 1 shows a cylindrical double walled tank composed of two concentric tubular chambers, an inner chamber 1 and an outer chamber 2, said members enclosing sealed circular space 3. The outer wall of the tank is provided with pipe connections through which steam can be passed into space 3 for heating the contents of inner chamber 1. In the top of the tank and immersed in the dilute caustic is mounted a cross-shaped tubular dispersing unit 4 through which molten sulfur is pumped from bin 5 via supply line 6. Bin 5 is heated by a steam jacket. On emerging from the dispersing unit, the molten sulfur is broken up into droplets 7 which fall through the column of dilute caustic solution and coalesce on reaching the interface 8 separating the upper dilute caustic layer from the lower layer of liquid sulfur. In the bottom of the tank and immersed in the layer of molten sulfur are mounted a series of tubular injection nozzles 9 having perforated ends through which the dilute caustic solution enters inner chamber 1 of the tank. The caustic is pumped from storage tank 10 via supply line 11 through steam jacket 12 and thence to manifold 13 which communicates with injection nozzles 9. The spent caustic passes out of the top of inner chamber 1 through exit line 13a and into cooling tower 14 from whence it is vented and discarded. The relief valve 15 prevents flashing of the spent caustic. The purified sulfur is drawn off through outlet 16 and collected or recycled back to the carbon disulfide generator which is then chlorinated to form carbon tetrachloride.

Figure 2:
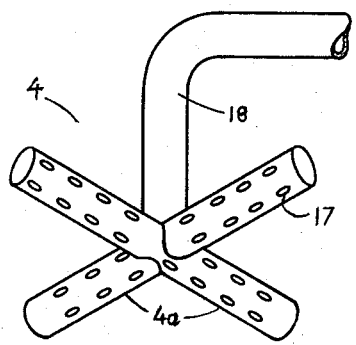
FIG. 2 is a perspective view of a dispersing unit for introducing the molten sulfur into the dilute caustic solution.

FIG. 2 shows a detailed construction of the dispersing unit for the molten sulfur. The dispersing head 4a consists of a cross shaped tubular member, the ends of which are sealed. The underside of the cross arms are provided with a plurality of small openings 17 from which the molten sulfur is introduced into the caustic solution. The molten sulfur enters the dispersing head 4a by way of the neck 18.

Figure 3:
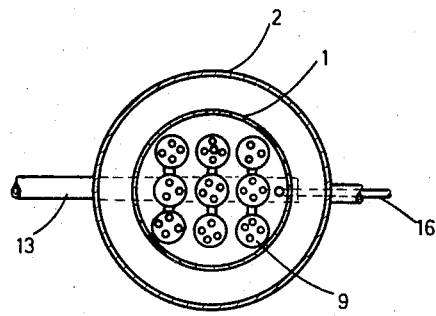
FIG. 3 is a multiple nozzle dispersing unit for introducing dilute caustic solution into the bottom of the tank.

FIG. 3 shows a detailed construction of the injection nozzles 9 which admit the caustic solution to the lower end of inner chamber 1. The nozzles are of tubular construction mounted on a manifold assembly 13 which distributes the caustic solution to the nozzles. The caustic solution passes out of the openings in the upper end of the nozzles through the liquid sulfur layer and into inner chamber 1.

Figure 4:
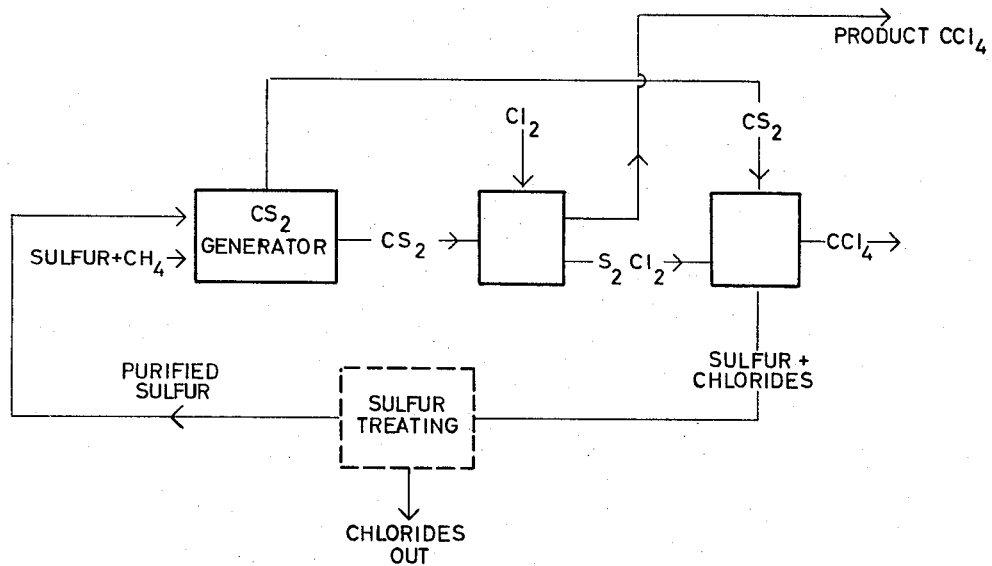
FIG. 4 is a block diagram showing the manufacture of carbon tetrachloride from carbon disulfide whereby the sulfur by-product is led through the apparatus of the invention for purification and conversion to carbon disulfide.

FIG. 4 represents a flow sheet or block diagram of a carbon tetrachloride manufacturing operation showing the sulfur treatment step of the invention. The by-product liquid sulfur as it is formed from the secondary chlorination stage enters the treating tower and after purification is pumped from the storage station to the carbon disulfide generator for conversion into carbon disulfide for further chlorination.

Although the dimensions of the treating tower and the ancillary apparatus are not particularly critical, we have found that a water or caustic solution height of about seventeen feet gives eminently satisfactory results. The aforesaid tower length is sufficient whereby one pass of the dispersed sulfur at an average particle size of $\frac{1}{16}$ inch extracts out the halide impurities to the required level— less than 10 p.p.m. with an average of 5 to 7 p.p.m. Approximately 4 volumes per minute of liquid by-product sulfur can be processed with a caustic flow of about 10 volumes per minute. Nor are the materials of construction critical, although for practical reasons they should be corrosion resistant. I have found that glass lined or plastic coated steel tubing and pipe are satisfactory and convenient materials of construction.

Since the water or aqueous caustic must be maintained at a temperature in excess of the melting point of sulfur and therefore considerably above the boiling point of water, the extraction operation must be carried out under pressure. In this connection, I have found that excellent results are achieved by keeping the aqueous medium at a temperature of about 140° C. at a pressure of about 55 lbs./in.$^2$. All joints and fittings must be capable of withstanding the superatmospheric pressure. It is because of the superatmospheric conditions that the spent caustic is discharged to the atmosphere through a relief valve after cooling since otherwise flashing would occur.

The top aqueous level in the extraction tower is regulated by a type LC-1 control valve which permits withdrawal of the aqueous phase according to its rate of feed into the column. The entire operation is instrumented to maintain temperature and pressure control as well as control of the interface level between the sulfur and aqueous layer.

The invention is further illustrated by the following examples.

Example I

A spray extraction unit was used of the type shown in FIG. 1, having as the extraction tower a 4-inch diameter glass lined pipe, 30-inches long. Approximately 2500 grams of sulfur containing 0.8% by weight of chloride value were charged into the tower and melted at 150° C. A single charge of 120 grams of 1.5% caustic soda solution was passed into the molten sulfur through a sparger in the bottom of the unit. The caustic was heated to 150° C. before contacting the molten sulfur. Pressure within the extraction unit was recorded at 50–55 p.s.i.g. Immediately after adding all of the caustic solution, through the sulfur, it was withdrawn from the top of the unit via a suitable dip tube. A sample of the molten sulfur after withdrawal was analyzed and found to contain less than 10 p.p.m. chloride value as determined by the Volhard method.

Example II

A spray extraction unit of the type shown in FIG. 1 composed of a 4-inch diameter glass lined pipe, 48-inches long was used. While feeding continuously at an average rate of 500 grams per minute of molten sulfur containing 1.2% of chloride value, a counter current flow of dilute caustic (0.85%) was fed at an average feed of 3,000 grams per minute. Analytical data identified the chloride values in the feed as one-third amount sulfur halide and two-thirds ferric chloride. Molten sulfur was withdrawn from the extractor at a rate equal to the feed rate to keep the sulfur height in the extractor constant. Analytical results showed the sulfur leaving the extractor to contain less than 7–8 p.p.m. chloride value.

Example III

Molen sulfur containing 3.4% chloride value by weight was fed continuously at a rate of 0.8 gallon per minute into a vertical extraction column, 6-inches in diameter and 20 feet high. The construction of the unit follows the drawing in FIG. 1. Regular tap water was fed counter current to the flow of sulfur, permitted to be sparged as droplets through the lower molten sulfur phase and coalesced to form an aqueous phase that was continuously withdrawn. Rate of water feed corresponds to 4.0 gallons per minute. The interface between molten sulfur and the aqueous phase was maintained at 17 ft. from the bottom of the extractor; temperature within the extractor was about 150° C. and a pressure of about 55 p.s.i.g.

Sulfur withdrawn continuously from the extractor at a rate of 0.8 gallon per minute showed by analysis, using the Volhard chloride determination, to contain a total value of 4–5 p.p.m. chloride .

I claim:
1. The method of removing iron and sulfur chlorides from the sulfur by-product formed in the manufacture of carbon tetrachloride by the chlorination of carbon disulfide which comprises passing the sulfur by-product in the form of molten droplets counter-currently through a dilute, basic aqueous medium, the temperature of which is above the melting point of sulfur whereby the iron and sulfur chlorides are extracted from the droplets, collecting the reconstituted molten sulfur after passage through the aqueous medium and allowing it to solidify.

2. The method according to claim 1 wherein the aqueous medium is a dilute caustic solution.

3. A process for purifying sulfur contaminated with impurities comprising mainly sulfur chlorides and iron halides which comprises passing the said contaminated sulfur in the form of molten droplets countercurrently through a dilute, basic aqueous medium, the temperature of which is above the melting point of sulfur whereby the iron and sulfur chlorides are extracted from the droplets and collecting the reconstituted molten sulfur after passage through said dilute aqueous base medium.

4. The method of claim 3 wherein the aqueous medium is dilute aqueous sodium hydroxide.

5. The method of claim 3 wherein the aqueous medium is dilute aqueous calcium hydroxide.

6. The method of claim 3 wherein the aqueous medium is dilute aqueous ammonium hydroxide.

7. The method of claim 2 wherein the dilute caustic solution has a concentration of from 0.85% to about 1.5% caustic based on weight.

References Cited

UNITED STATES PATENTS

| | | | |
|---|---|---|---|
| 1,967,874 | 7/1934 | Dunn | 23—224 |
| 2,336,688 | 12/1943 | Jones et al. | 23—224 |
| 3,273,966 | 9/1966 | Bowling et al. | 23—224 X |

MILTON WEISSMAN, *Primary Examiner.*

OSCAR R. VERTIZ, *Examiner.*

A. J. GREIF, *Assistant Examiner.*